US010122198B2

United States Patent
Zhang et al.

(10) Patent No.: US 10,122,198 B2
(45) Date of Patent: Nov. 6, 2018

(54) CHARGING ADAPTER HAVING PNEUMATIC PUMP AND CHARGING SYSTEM

(71) Applicant: ZTE CORPORATION, Guangdong (CN)

(72) Inventors: Yan Zhang, Guangdong (CN); Wei Jiang, Guangdong (CN)

(73) Assignee: ZTE Corporation, Guangdong (CN)

( * ) Notice: Subject to any disclaimer, the term of this patent is extended or adjusted under 35 U.S.C. 154(b) by 230 days.

(21) Appl. No.: 15/102,697

(22) PCT Filed: May 29, 2014

(86) PCT No.: PCT/CN2014/078754
§ 371 (c)(1),
(2) Date: Jun. 8, 2016

(87) PCT Pub. No.: WO2014/187383
PCT Pub. Date: Nov. 27, 2014

(65) Prior Publication Data
US 2016/0315482 A1 Oct. 27, 2016

(30) Foreign Application Priority Data
Dec. 10, 2013 (CN) .................... 2013 2 0809274 U

(51) Int. Cl.
*H02J 7/00* (2006.01)
*H02J 7/32* (2006.01)
(Continued)

(52) U.S. Cl.
CPC ............ *H02J 7/007* (2013.01); *H02J 7/0042* (2013.01); *H02J 7/32* (2013.01); *H04R 7/02* (2013.01); *H02J 15/006* (2013.01); *Y02B 40/90* (2013.01)

(58) Field of Classification Search
CPC . H02J 7/007; H02J 7/0042; H02J 7/32; H04R 7/02
(Continued)

(56) References Cited

U.S. PATENT DOCUMENTS

| 5,889,383 A * | 3/1999 | Teich ..................... H02J 7/0047 |
| | | 320/107 |
| 2009/0293471 A1* | 12/2009 | Davis ...................... F03B 17/00 |
| | | 60/495 |
| 2013/0165847 A1* | 6/2013 | Scarpaci ............... A61M 1/288 |
| | | 604/28 |

FOREIGN PATENT DOCUMENTS

| CN | 1895199 | 1/2007 |
| CN | 103199602 | 7/2013 |
| CN | 203645386 | 6/2014 |

OTHER PUBLICATIONS

International Search Report for PCT/CN2014/078754, dated Aug. 11, 2014, 4 pages.

* cited by examiner

*Primary Examiner* — Nathaniel Pelton
(74) *Attorney, Agent, or Firm* — Nixon & Vanderhye P.C.

(57) ABSTRACT

A charging adapter and a mobile terminal are disclosed. The charging adapter includes: a pneumatic pump, pneumatic cover, a sealing rubber gasket, a pneumatic valve, an air pressure monitor for monitoring air pressure intensity in the pneumatic cover, and an air pressure controller for controlling the pneumatic pump and the pneumatic valve to be turned on and off. The pneumatic pump, the air pressure monitor, the air pressure controller and the pneumatic valve are fixed at any location on a side surface of the pneumatic cover respectively. The sealing rubber gasket is disposed at a periphery of a front surface of the pneumatic cover. And the pneumatic cover is configured to tightly fit with a sound (Continued)

hole of a speaker SPK module of a mobile terminal through the sealing rubber gasket during charging, thereby forming a sealed cavity.

10 Claims, 4 Drawing Sheets

(51) Int. Cl.
*H04R 7/02* (2006.01)
*H02J 15/00* (2006.01)
(58) Field of Classification Search
USPC .......................................................... 320/107
See application file for complete search history.

CHARGING ADAPTER HAVING PNEUMATIC PUMP AND CHARGING SYSTEM

CROSS-REFERENCES TO RELATED APPLICATIONS

This application is a United States national phase application of co-pending international patent application number PCT/CN2014/078754, filed on May 29, 2014 which claims priority to a Chinese patent application No. 201320809274.6 filed on Dec. 10, 2013, disclosures of both of which are incorporated herein by reference in their entireties.

TECHNICAL FIELD

The present disclosure relates to charging technologies in the field of mobile communications, and in particular, to a charging adapter and a mobile terminal.

BACKGROUND

With a continuous development of electronic technologies and communication technologies, a growing number of users start to use electronic products such as mobile phones, tablet computers, portable mobile terminals and the like, and these electronic products are indispensable in users' daily life. However, current electronic products become smaller and smaller and thinner and thinner, and consequently, battery capacity of electronic products may be limited, and multi-service and multi-function mobile terminals are increasingly and widely criticized in battery capacity. Therefore, it is one of problems having been explored to be solved how to prolong stand-by time so as to avoid unnecessary troubles resulted from sudden interruption of power.

In the existing art, a document, having a patent number of CN200620095890.X and a title of invention of "Mobile Phone Rechargeble by Hand Pressing", discloses a rechargeable mobile phone, including a mobile phone body, a rechargeable battery and a charging mechanism. The charging mechanism includes a mini generator located on the mobile phone body; a power output terminal of the mini generator is connected to an input terminal of the rechargeable battery, and an output terminal of the rechargeable battery is connected to a power input terminal of the mobile phone body to finish charging. A document, having a patent application number of CN200810002173.1 and a title of invention of "Power-cut-free Mobile Telephone", discloses a rechargeable mobile phone, including a cylindrical or circular power generation device and a disk type generator which are installed in the mobile phone; and power is generated by a user by shaking the mobile phone, a crank, a pulling rope and the like. As can be seen, these rechargeble mobile phones need to include a separate generator or a power generation device, which increases sizes of the mobile phones to a large extent, and thus making it difficult to achieve smaller, lighter and thinner mobile phones.

In addition, most of existing mobile terminals are charged via cables, where a mobile terminal has a charging interface inserting a charging adapter. It is worthy to study how to get rid of charging via cables for mobile terminals. At present, newly launched wireless charging technologies use coil coupling for charging, namely, charging is achieved by electrical energy interaction of a coupling coil built in a mobile phone and a coupling coil of a charge socket. This method needs a coupling coil disposed in a mobile terminal, which needs to occupy certain space in a mobile phone. Therefore, this scheme is unavailable to ultrathin and small-sized mobile terminals.

At present, efforts are made to seek solutions to how to use an existing device to timely charge an existing small-sized mobile terminal so as to get rid of charging via cables and prevent a mobile terminal from being unable to use in the field, on a trip, during war or in a natural disaster, and how to timely charge a mobile terminal in an emergency.

This section provides background information related to the present disclosure which is not necessarily prior art.

SUMMARY

This section provides a summary of various of implementations or examples of the technology described in the disclosure, and is not a comprehensive disclosure of the full scope or all features if the disclosed technology.

In view of this, embodiments of the disclosure provide a charging adapter and a mobile terminal, an existing device of the mobile terminal can be used for charging, getting rid of a wired charging manner, and a purpose of charging the mobile terminal anywhere and anytime can be achieved.

Embodiments of the disclosure provide a charging adapter, and the charging adapter includes: a pneumatic pump, a pneumatic cover, a sealing rubber gasket, a pneumatic valve, an air pressure monitor for monitoring air pressure intensity in the pneumatic cover, and an air pressure controller for controlling the pneumatic pump and the pneumatic valve to be turned on or off; where, the pneumatic pump, the air pressure monitor, the air pressure controller and the pneumatic valve are fixed at any location on a side surface of the pneumatic cover; the sealing rubber gasket are disposed at a periphery of a front surface of the pneumatic cover; and the pneumatic cover tightly fits with a sound hole of a speaker (SPK) module of a mobile terminal through the sealing rubber gasket during charging, thereby forming a sealed cavity.

In the above solution, an inflation end or a suction end of the pneumatic pump is communicated with the pneumatic cover.

In the above solution, the charging adapter further includes a switch for controlling to start or finish charging, and the switch is disposed on the charging adapter.

Embodiments of the disclosure further provide a mobile terminal including:

an SPK module, configured to generate different quantities of electricity through vibration of its own diaphragm according to different air pressures in a sealed cavity;

a charging management module, configured to convert the quantity of electricity generated by the SPK module to electric current needed by a power management module; and the power management module, configured to store the electric current obtained from the charging management module into a battery of the mobile terminal; where a sound hole of the SPK module tightly fits with a pneumatic cover of a charging adapter through the sealing rubber gasket during charging, thereby forming a sealed cavity.

In the above solution, the SPK module includes a diaphragm, a front sound cavity, a rear sound cavity, and the sound hole; where the front sound cavity is isolated from the rear sound cavity, and the isolated front sound cavity and the rear sound cavity form a magnetic steel cavity providing space for vibration of the diaphragm.

In the above solution, the SPK module is more than one; and the SPK module is equal to the pneumatic cover of the charging adapter in quantity, and is corresponding to each other in location.

In the above solution, the charging management module includes a rectifying circuit, a filtering and voltage-stabilizing circuit, a transformer circuit and a charging control circuit that are connected in sequence; the charging management module further includes a charging monitoring circuit, an output end of the charging monitoring circuit is connected to an output end of the charging control circuit, and both the output end of the charging monitoring circuit and the output end of the charging control circuit are connected to the battery.

Embodiments of the disclosure also provide a charging system comprising the charging adapter and the mobile terminal.

The charging adapter and the mobile terminal provided by embodiments of the disclosure utilize the existing SPK in the mobile terminal to fit with the dedicated charging adapter of a special composition and structure. A pressure environment is formed by the pneumatic pump, the pneumatic cover, the sealing rubber gasket, the air pressure monitor, the air pressure controller and the pneumatic valve. The sound hole of the SPK module tightly fits with the pneumatic cover through the sealing rubber gasket during charging, thereby forming a sealed cavity. The SPK module generates different quantities of electricity through vibration of its own diaphragm according to different air pressures in the sealed cavity, so that an existing device in the mobile terminal may be directly used for charging. Therefore, a user gets out of trouble from looking for a charging cable for charging because the user may achieve an objective of charging the mobile terminal at any time and any place as long as a corresponding charging management circuit and a dedicated charging adapter are matched.

DETAILED DESCRIPTION

In embodiments of the disclosure, an existing SPK (also referred to as Speaker) of a mobile terminal and a dedicated charging adapter matched with the SPK are used for charging. A pressure environment is formed by a pneumatic pump, a pneumatic cover, a sealing rubber gasket, an air pressure monitor, an air pressure controller and a pneumatic valve. A sound hole of the SPK module (also referred to as Speaker) tightly fits with the pneumatic cover through the sealing rubber gasket during charging, thereby forming a sealed cavity. The SPK module generates different quantities of electricity through vibration of its own diaphragm according to different air pressures in the sealed cavity.

Following further describes in detail the disclosure by reference to the accompanying drawings and embodiments.

Figure 1:
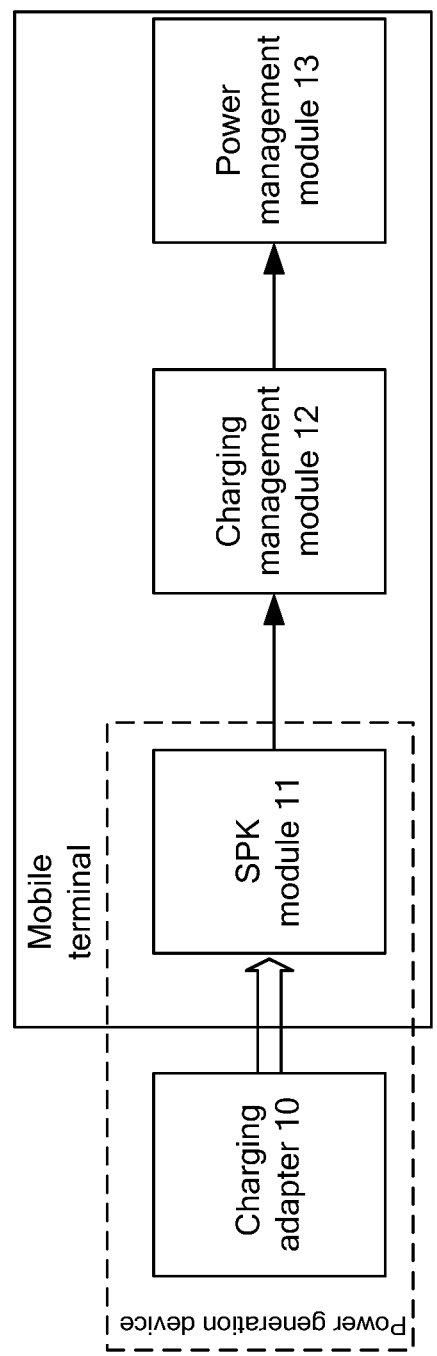
FIG. 1 shows a schematic structural diagram of composition of a charging adapter and a mobile terminal according to embodiments of the disclosure.

FIG. 1 shows a schematic structural diagram of composition of a charging adapter and a mobile terminal according to embodiments of the disclosure, as shown in FIG. 1, the mobile terminal in embodiments of the disclosure includes an SPK module 11, a charging management module 12 and a power management module 13. The charging adapter 10 is connected to the SPK module 11 in the mobile terminal, the SPK module 11 is connected to the charging management module 12, and the charging management module (also referred to as charging manager) 12 is connected to the power management module (also referred to as power manager) 13.

Here, the charging adapter 10 and the SPK module 11 may be regarded as a power generation device. During charging, the sound hole of the SPK module 11 tightly fits with the pneumatic cover of the charging adapter 10 through the sealing rubber gasket of the charging adapter 10.

Specifically, the SPK module 11 is configured to generate different quantities of electricity through vibration of its own diaphragm according to different air pressures in a sealed cavity.

Here, the sealed cavity is formed by the sound hole of the SPK module 11 and the pneumatic cover of the charging adapter 10.

The charging management module 12 is configured to convert the electricity generated by the SPK module 11 to electric current needed by the power management module 13.

The power management module 13 is configured to store the electric current obtained from the charging management module 12 into a battery of the mobile terminal; and the power management module 13 is further configured to keep the battery under a predischarging state.

In practical application, the power management module 13 may be implemented by a commonly-used power source.

Preferably, the SPK module 11 includes a diaphragm, a front sound cavity, a rear sound cavity 38 and the sound hole.

Here, the SPK module 11 of the mobile terminal is designed to be the same as that of an existing mobile terminal. The front sound cavity and the rear sound cavity 38 in the SPK module 11 are isolated from each other, and the isolated front sound cavity and the rear sound cavity 38 form a magnetic steel cavity providing space for vibration of the diaphragm of the SPK module 11.

The diaphragm of the SPK module 11 is configured with a coil, a number of windings of the coil may be designed according to different cases. Different quantities of electricity are generated in one vibration if the number of windings of the coil is different, thereby affecting conversion of electrical energy.

Specifically, in a charging process, the diaphragm of the SPK module 11 moves to cut magnetic lines of force in a magnetic field formed in the magnetic steel cavity of the SPK module 11 according to different air pressures in the sealed cavity, thereby implementing conversion from mechanical energy to electrical energy. The number of the SPK module 11 may be more than one, which depends on the mobile terminal itself. A matched charging adapter is designed according to locations and the number of SPK modules 11. For example, if the mobile terminal has two SPK modules which may be disposed at an upper end and a lower end of the mobile terminal, during designing the charging adapter, according to the locations of the SPK modules, the number of pneumatic covers of the matched the charging adapter should also be two, and the two pneumatic covers are respectively corresponding to the SPK modules in location.

Figure 2:
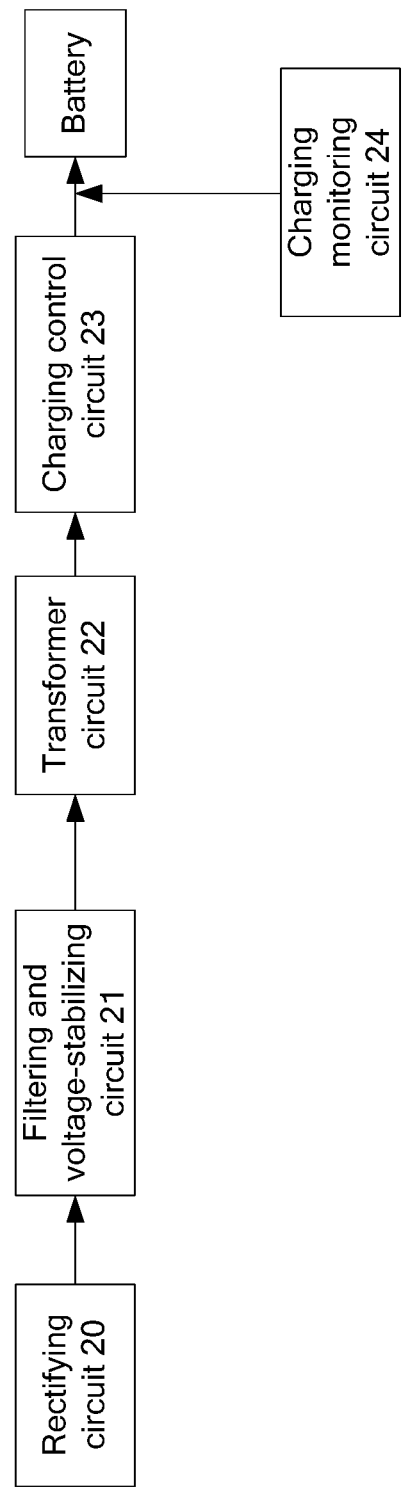
FIG. 2 is a schematic structural diagram of composition of a charging management module in the mobile terminal according to embodiments of the disclosure.

As shown in FIG. 2, the charging management module 12 includes a rectifying circuit 20, a filtering and voltage-stabilizing circuit 21, a transformer circuit 22, a charging control circuit 23 and a charging monitoring circuit 24. An output end of the rectifying circuit 20 is connected to an input end of the filtering and voltage-stabilizing circuit 21, an output end of the filtering and voltage-stabilizing circuit 21 is connected to an input end of the transformer circuit 22, an output end of the transformer circuit 22 is connected to an input end of the charging control circuit 23, and an output end of the charging circuit 23 is connected to a charging battery, where an output end of the charging monitoring circuit 24 is connected to a node between the output end of the charging control circuit 23 and the charging battery.

The rectifying circuit 20 is a single phase bridge type rectifier circuit, and four diodes are mutually connected into a bridge structure. When the diaphragm of the SPK module periodically moves to cut magnetic lines of force in the magnetic steel cavity formed by the front sound cavity and the rear sound cavity, mechanical energy is converted to electrical energy, which is alternating current (AC). Using unidirectional conduction of diodes, the rectifying circuit 20 cuts away negative half-wave of AC to implement rectification of the converted AC, so that AC is converted to direct current (DC). The output end of the rectifying circuit 20 is connected to the input end of the filtering and voltage-stabilizing circuit 21.

The filtering and voltage-stabilizing circuit 21 is disposed between the rectifying circuit 20 and the charging control circuit 23, including devices such as a capacitor and a voltage-regulator tube, where the voltage-regulator tube is close to the charging control circuit 23, and an anode of the voltage-regulator tube is grounded in order to achieve an effect of protecting circuits. The filtering and voltage-stabilizing circuit 21 is used for filtering output voltage of the rectifying circuit 20 to eliminate ripples so that voltage is outputted stably and it is convenient for charging the charging control circuit 23.

The transformer circuit 22 includes a transformer, resistors and capacitors, and is used for converting generated voltage to voltage required for the mobile terminal.

The charging control circuit 23 includes a PMOS transistor or a diode, and is used for controlling charging current. The charging control circuit 23 is connected to a battery of the mobile terminal to charge the battery.

The charging monitoring circuit 24 is connected to the output end of the charging control circuit 23, and is used for monitoring electric current in circuits. For example, the charging monitoring circuit 24 may consist of a CN3066 and a relay, when a portable power source monitors that it is charged by a charger, the relay orders the CN3066 to start to work. The CN3066 divides a whole charging management process into four parts: precharging, constant current charging, constant voltage charging and maintenance charging. When the CN3066 starts to work, the CN3066 may monitor whether battery voltage is lower or not, if so, trickle charging is adopted, namely, the battery is charged by smaller constant current until the battery voltage rises to a safe value, thereby ensuring charging stability and safety and ensuring charging current and voltage within a safety range.

Figure 3:
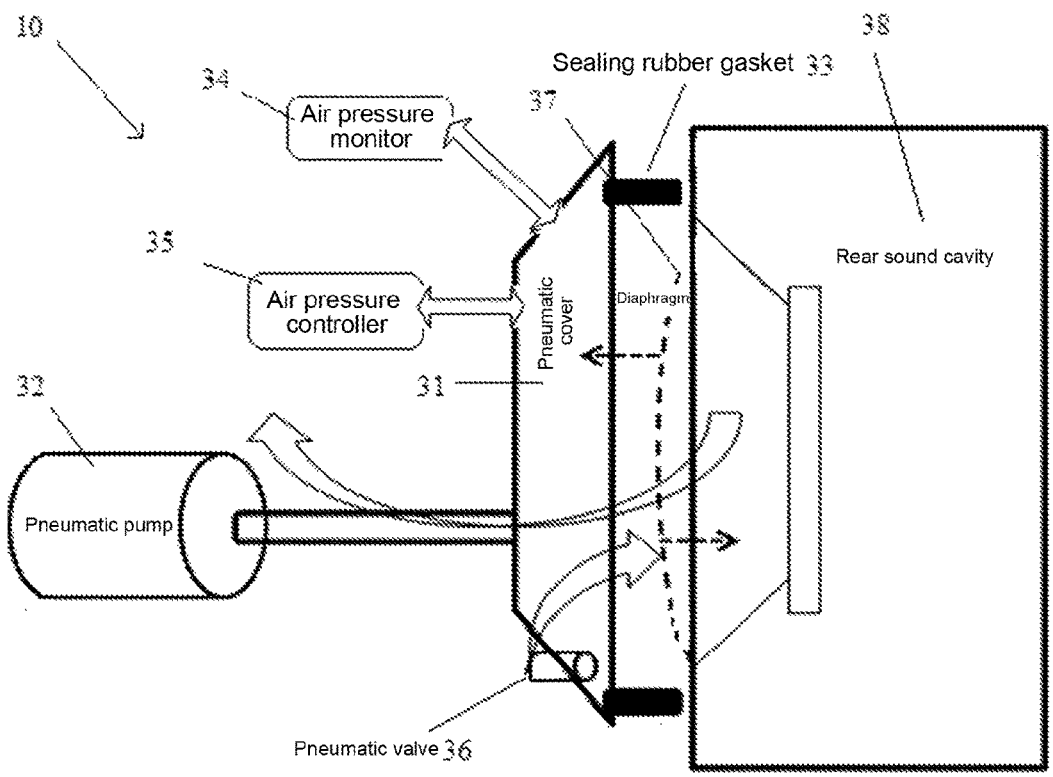
FIG. 3 shows a schematic structural diagram of composition of the charging adapter according to embodiments of the disclosure.

FIG. 3 shows a schematic structural diagram of composition of the charging adapter according to embodiments of the disclosure, as shown in FIG. 3, the charging adapter 10 of embodiments of the disclosure includes: a pneumatic cover 31, a pneumatic pump 32, a sealing rubber gasket 33, an air pressure monitor 34, an air pressure controller 35 and a pneumatic valve 36; where the pneumatic pump 32, the air pressure monitor 34, the air pressure controller 35 and the pneumatic valve 36 are fixed on a side surface of the pneumatic cover 31; the a sealing rubber gasket 33 are disposed at a periphery of the pneumatic cover 31, and an inflation end or a suction end of the pneumatic pump 32 is communicated with the pneumatic cover.

As shown in FIG. 3, the charging adapter includes the pneumatic cover 31, the location of the pneumatic cover 31 is determined according to that of the sound hole of the SPK module in the mobile terminal, and the shape and the size of the pneumatic cover 31 are also determined according to those of the sound hole of the SPK module so that the pneumatic cover 31 tightly fits with the sound hole of the SPK module during charging. The pneumatic cover 31 may have characteristics of good suppleness and airtightness so as to tightly fit with the SPK module. In practical application, material of the pneumatic cover 31 may be any material having the above characteristic, including but not limited to plastics or rubbers.

The pneumatic pump 32 may be disposed at any position of the charging adapter, and a specific location thereof may be arranged according to a user's or designer's habit. The inflation end or the suction end of the pneumatic pump 32 is communicated with the pneumatic cover. When the mobile terminal is charged, the pneumatic pump 32 is started so that the air pressure intensity in the pneumatic cover 31 drops. The pneumatic pump 32 stops working when the air pressure intensity reaches a preset minimum threshold pressure intensity.

The sealing rubber gasket 33 is disposed at a periphery of a front surface of the pneumatic cover 31, the sound hole of the SPK module 11 in the mobile terminal tightly fits with the pneumatic cover 31 through the sealing rubber gasket, and material of the sealing rubber gasket may be rubbers, but not limited to rubbers.

The air pressure monitor 34 is disposed at any position on a side surface of the pneumatic cover 31, and a specific position thereof may be arranged according to a user's or designer's habit. The air pressure monitor 34 may use a chip and is used for monitoring air pressure intensity in the pneumatic cover 31; and the air pressure monitor 34 may also be provided with a display screen for displaying air pressure intensity in the pneumatic cover 31 in real time.

The air pressure controller 35 is disposed at any position on a side surface of the pneumatic cover 31, and a specific position thereof may be determined according to a user's or designer's habit. The air pressure controller 35 may use a chip and is used for controlling the pneumatic pump 32 and the pneumatic valve 36 to be turned on or off. When the air pressure monitor 34 monitors that air pressure intensity in the pneumatic cover 31 reaches the preset minimum threshold pressure intensity, the air pressure controller 35 controls the pneumatic pump 32 to stop working, meanwhile, the air pressure controller 35 controls the pneumatic pump 36 to be turned on, air pressure in the sealed cavity will gradually rise to be equal to atmospheric pressure, and the pneumatic pump 32 is started when the air pressure monitor 34 monitors that air pressure in the pneumatic cover 31 is equal to the atmospheric pressure.

The pneumatic valve 36 is disposed at any location on a side surface of the pneumatic cover 31, and a specific location thereof may be set up according to a user's or designer's habit. The pneumatic valve 36 is started when air pressure intensity in the pneumatic cover 31 reaches a preset minimum or maximum threshold pressure intensity, so that air pressure in the pneumatic cover is equal to the atmospheric pressure.

The charging adapter 10 further includes a switch (not shown) for controlling to start or finish charging. When the mobile terminal needs to be charged, the switch is switched on to start charging; and the switch is switched off when charging is finished. The switch may be disposed at any location of the charging adapter, and a specific location thereof may be set up according to a user's or designer's habit.

In embodiments of the disclosure, the sound hole of the SPK module 11 is corresponding to the pneumatic cover 31 of the charging adapter 10 in location. The mobile terminal needs to be placed on the charging adapter 10 during charging, and the sound hole of the SPK module 11 in the mobile terminal tightly fits with the pneumatic cover 31 on the charging adapter 10 through the sealing rubber gasket 33.

A specific charging process is described as below. The sound hole of the SPK module 11 in the mobile terminal tightly fits with the pneumatic cover 31 of the charging adapter through the sealing rubber gasket, and the switch on the charging adapter is turned on. After the pneumatic pump 32 is started, the pneumatic pump 32 extracts air in the sealed cavity formed by the pneumatic cover 31 and the sound hole of the SPK module 11, so that air pressure in the sealed cavity drops. At the moment, a diaphragm 37 of the SPK module 11 will be in a state of being hunched up in a direction toward the pneumatic cover. The air pressure monitor 34 monitors a whole changing process of the pneumatic cover 31, and displays the changing process on a display screen of the air pressure monitor 34. When air pressure intensity reaches a preset minimum threshold pressure intensity $P_1$, the air pressure controller 35 sends an instruction to let the pneumatic pump 32 stop working. The air pressure controller 35 controls the pneumatic valve 36 to be turned on so that air pressure in the sealed cavity will gradually rise to be equal to atmospheric pressure, and in this process, the diaphragm 37 of the SPK module 11 will return to an initial state. When the air pressure monitor 34 monitors that air pressure is equal to the atmospheric pressure, the pneumatic pump 32 is started again, thereby conducting a periodic reciprocating motion. Through a periodic reciprocating motion, the coil of the SPK module 11 periodically moves to cut magnetic lines of force in a magnetic field of the magnetic steel, mechanical energy is converted to electrical energy, and it is achieved that the mobile terminal obtains electrical energy wirelessly.

Optionally, the charging process may also be described as below. The sound hole of the SPK module 11 in the mobile terminal tightly fits with the pneumatic cover 31 of the charging adapter through the sealing rubber gasket. The switch on the charging adapter 10 is turned on, and the pneumatic pump 32 fills air into the sealed cavity formed by the pneumatic cover 31 and the sound hole of the SPK module 11, so that air pressure in the sealed cavity will rise. At the moment, the diaphragm 37 on the SPK module 31 will be in a state of being hunched up in a direction opposite the pneumatic cover. The air pressure monitor 34 monitors a whole changing process of the pneumatic cover 31. When air pressure intensity reaches a preset maximum threshold pressure intensity $P_2$, the air pressure controller 35 sends an instruction to let the pneumatic pump 32 stop working, the air pressure controller 35 controls the pneumatic valve 36 to be turned on so that air pressure in the sealed cavity will gradually descend to be equal to atmospheric pressure, and in this process, the diaphragm 37 of the SPK module 11 will return to an initial state. When the air pressure monitor 34 monitors that air pressure is equal to the atmospheric pressure, the pneumatic pump 32 is started again. Through a periodic reciprocating motion, the coil of the SPK module 11 periodically moves to cut magnetic lines of force in a magnetic field of the magnetic steel, mechanical energy is converted to electrical energy, and it is achieved that the mobile terminal obtains electrical energy wirelessly.

The minimum threshold pressure intensity and the maximum pressure intensity may be obtained by calculation, $P_0$ is the atmospheric pressure, $P_1$ is the minimum threshold pressure intensity, $P_2$ is the maximum threshold pressure intensity, S is the area of an overlapping region of the pneumatic cover and the sound hole of the SPK module, and $F_{max}$ is a maximum tolerable pressure of the SPK, which may be calculated specifically by using following formulas:

from the atmospheric pressure formula: F=PS, it is obtained that:

$$(P_0 - P_1)S = F_{max},$$

then $$P_1 = P_0 - \frac{F_{max}}{S},$$

$$(P_2 - P_0)S = F_{max},$$

then $$P_2 = P_0 + \frac{F_{max}}{S}.$$

Figure 4:
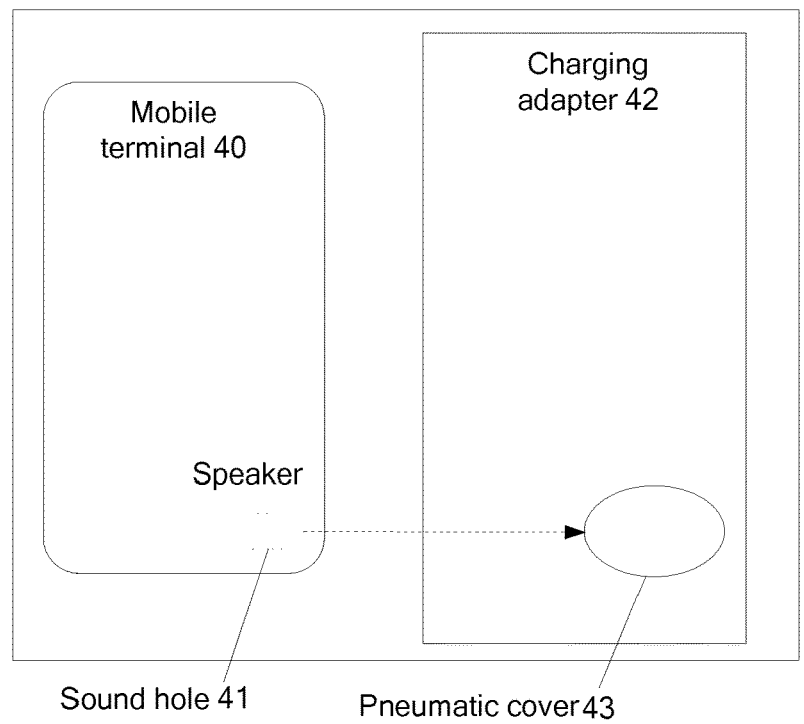
FIG. 4 shows a schematic diagram of a charging principle of the mobile terminal with a single SPK according to embodiments of the disclosure.

FIG. 4 provides an embodiment of charging the mobile terminal of a single SPK, as shown in FIG. 4, during charging, the mobile terminal 40 is placed on the charging adapter 42, and the sound hole 41 of the SPK module 11 in the mobile terminal tightly fits with the pneumatic cover 43 of the charging adapter through the sealing rubber gasket (not shown). According to the change of pressure between the pneumatic cover 43 and the sound hole of the SPK module 11, the diaphragm 37 of the SPK module 11 periodically vibrates, so that the coil of the SPK module 11 periodically moves to cut magnetic lines of force in a magnetic field of the magnetic steel, mechanical energy is converted to electrical energy, and the battery of the mobile terminal is charged by the charging management module.

Figure 5:
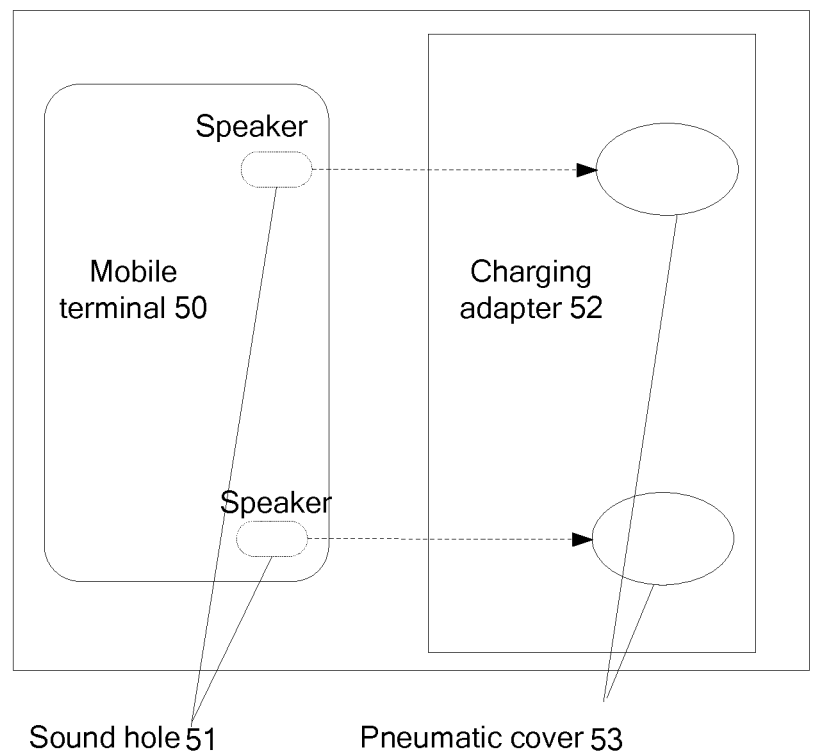
FIG. 5 shows a schematic diagram of a charging principle of the mobile terminal with two SPKs according to embodiments of the disclosure.

FIG. 5 provides an embodiment of charging the mobile terminal of two SPK modules, as shown in FIG. 5, it is different from the mobile terminal 40 of a single SPK module in that: corresponding to two sound holes 51 of the SPK modules, the number of the pneumatic covers 53 of the charging adapter 52 is also two, which are corresponding to the sound holes 51 in location; the pneumatic covers 53 may be movable, so that the pneumatic covers 53 may be moved according to the locations of the SPK modules to achieve an objective of charging the mobile terminal.

According to the number of the SPK modules, different quantities of pneumatic covers may be designed for the charging adapter. Locations of the pneumatic covers on the adapter may be designed according to a user's habit or a designer's intention, or the pneumatic covers can slide on the adapter, which is suitable for providing different air pressure for multiple SPK modules at different locations.

In addition, the charging adapter in the disclosure is not limited to the module as mentioned in the disclosure, but includes all devices or systems that can induce vibration of the diaphragm of the SPK module. Even it may be regarded that pressure in a virtual pneumatic cover corresponding to the SPK module is caused to change by blowing by a human mouth toward the diaphragm of the SPK module, so that the diaphragm of the SPK module vibrates, and a motion of cutting magnetic lines of force is conducted in a magnetic field formed by the SPK magnetic steel cavity, thereby achieving a conversion from mechanical energy to electrical energy.

In conclusion, the disclosure may use an existing SPK module on an existing small-sized mobile terminal, and use air pressure to push a diaphragm of the SPK module to vibrate, so that a coil on the diaphragm periodically moves to cut magnetic lines of force in a magnetic field of a magnetic steel, thereby generating electrical energy. It is achieved that a mobile terminal obtains electrical energy wirelessly, and it is achieved an objective of fast and convenient charging in an emergency.

What is mentioned above is merely optional embodiments of the disclosure, and is not intended to limit the scope of protection of the disclosure.

INDUSTRIAL APPLICABILITY

The charging adapter and the mobile terminal provided by embodiments of the disclosure utilize the existing SPK in the mobile terminal to fit with the dedicated charging adapter of a special composition and structure. A pressure environment is formed by the pneumatic pump, the pneumatic cover, the sealing rubber gasket, the air pressure monitor, the air pressure controller and the pneumatic valve. The sound hole of the SPK module tightly fits with the pneumatic cover through the sealing rubber gasket during charging, thereby forming a sealed cavity. The SPK module generates different quantities of electricity through vibration of its own diaphragm according to different air pressures in the sealed cavity, so that an existing device in the mobile terminal may be directly used for charging. Therefore, a user gets out of trouble from looking for a charging cable for charging because the user may achieve an objective of charging the mobile terminal at any time and any place as long as a corresponding charging management circuit and a dedicated charging adapter are matched.

What is claimed is:

1. A charging adapter, comprising: a pneumatic pump, a pneumatic cover, a sealing rubber gasket, a pneumatic valve, an air pressure monitor for monitoring air pressure intensity in the pneumatic cover, and an air pressure controller for controlling the pneumatic pump and the pneumatic valve to be turned on and off; wherein
the pneumatic pump, the air pressure monitor, the air pressure controller and the pneumatic valve are fixed on a side surface of the pneumatic cover respectively, and the sealing rubber gasket is disposed at a periphery of an opening of the pneumatic cover,
wherein the pneumatic cover is configured to tightly fit with a sound hole of a speaker of a mobile terminal through the sealing rubber gasket during charging so as to form a sealed cavity, the pneumatic pump being configured to extract air from the sealed cavity or fill air into the sealed cavity.

2. The charging adapter according to claim 1, wherein an inflation end or a suction end of the pneumatic pump is communicated with the pneumatic cover.

3. The charging adapter according to claim 1, wherein the charging adapter further comprises a switch for controlling to start or finish charging.

4. A charging system, comprising: a charging adapter and a mobile terminal,
the charging adapter comprising:
a pneumatic pump;
a pneumatic cover;
a sealing rubber gasket;
a pneumatic valve;
an air pressure monitor for monitoring air pressure intensity in the pneumatic cover; and
an air pressure controller for controlling the pneumatic pump and the pneumatic valve to be turned on and off,
wherein the pneumatic pump, the air pressure monitor, the air pressure controller and the pneumatic valve are fixed on a side surface of the pneumatic cover respectively, and the sealing rubber gasket is disposed at a periphery of an opening of the pneumatic cover,
the mobile terminal comprising:
a speaker comprising a diaphragm and a sound hole, configured to generate different quantities of electricity through vibration of the diaphragm according to different air pressures in a sealed cavity;
a charging manager, configured to convert the quantity of electricity generated by the speaker to electric current; and
a power manager, configured to store the electric current obtained from the charging manager into a battery of the mobile terminal;
wherein the sound hole of the speaker tightly fits with the pneumatic cover through the sealing rubber gasket during charging, thereby forming the sealed cavity.

5. The charging system according to claim 4, wherein the number of the speaker is greater than one; and the speakers are equal to the pneumatic covers of the charging adapter in quantity, and are corresponding to the pneumatic covers of the charging adapter in location.

6. The charging system according to claim 4, wherein the diaphragm of the speaker is provided with a coil.

7. The charging system according to claim 4, wherein an inflation end or a suction end of the pneumatic pump is communicated with the pneumatic cover.

8. The charging system according to claim 4, wherein the charging adapter further comprises a switch for controlling to start or finish charging.

9. The charging system according to claim 4, wherein the charging manager comprises a rectifying circuit, a filtering and voltage-stabilizing circuit, a transformer circuit and a charging control circuit that are successively connected; the charging management module further comprises a charging monitoring circuit, an output end of the charging monitoring circuit is connected to an output end of the charging control circuit, and both the output end of the charging monitoring circuit and an output end of the charging control circuit are configured to be connected to the battery.

10. The charging system according to claim 4, wherein the speaker further comprises a front sound cavity and a rear sound cavity;
wherein the front sound cavity is isolated from the rear sound cavity, and the isolated front sound cavity and the rear sound cavity form a magnetic steel cavity providing space for vibration of the diaphragm.

\* \* \* \* \*